US006164693A

United States Patent [19]

Mattes et al.

[11] Patent Number: 6,164,693

[45] **Date of Patent: *Dec. 26, 2000**

[54] DEVICE FOR DETECTING THE TYPE OF OCCUPANCY OF THE PASSENGER'S SEAT OF A MOTOR VEHICLE

[75] Inventors: Bernhard Mattes, Sachsenheim; Marko Maschek, Vaihingen/Enz, both of Germany

[73] Assignee: Robert Bosch GmbH, Stuttgart, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/025,623

[22] Filed: Feb. 18, 1998

[30] Foreign Application Priority Data

Jun. 10, 1997 [DE] Germany .......................... 197 24 344

[51] Int. Cl.[7] .................................................. B60R 21/32

[52] U.S. Cl. .......................... 280/735; 180/272; 307/10.1

[58] Field of Search ............................ 280/735; 180/268, 180/272, 286; 307/10.1

[56] References Cited

U.S. PATENT DOCUMENTS

| | | | |
|---|---|---|---|
| 5,129,478 | 7/1992 | Suenaga et al. | 180/268 |
| 5,544,914 | 8/1996 | Borninski et al. | 280/735 |
| 5,570,903 | 11/1996 | Meister et al. | 280/735 |
| 5,655,619 | 8/1997 | Suran et al. | 180/270 |
| 5,785,347 | 7/1998 | Adolph et al. | 280/735 |
| 5,803,491 | 9/1998 | Barnes et al. | 280/735 |
| 5,816,611 | 10/1998 | Parn | 280/735 |
| 5,851,026 | 12/1998 | Schoos et al. | 280/735 |
| 5,890,085 | 3/1999 | Corrado et al. | 280/735 |
| 5,893,582 | 4/1999 | Allen et al. | 280/735 |

FOREIGN PATENT DOCUMENTS

| | | |
|---|---|---|
| 44 10 402 | 9/1994 | Germany . |
| 44 00 664 | 8/1995 | Germany . |
| 196 30 260 | 1/1997 | Germany . |
| 2 289 563 | 11/1995 | United Kingdom . |

*Primary Examiner*—J. J. Swann
*Assistant Examiner*—James S. McClellan
*Attorney, Agent, or Firm*—Kenyon & Kenyon

[57] ABSTRACT

A simple device for reliably detecting at least one type of occupancy of the passenger's seat of a motor vehicle in which the passenger-side air bag must absolutely not be activated. A manually operated switch is provided, having at least one switch position assigned to a type of occupancy for which the passenger-side air bag must not be activated; a control unit is provided which deactivates the passenger-side air bag when the switch is not in this switch position; and an arrangement is provided to prevent the vehicle from driving away after the engine has been started unless the switch has first been operated.

11 Claims, 1 Drawing Sheet

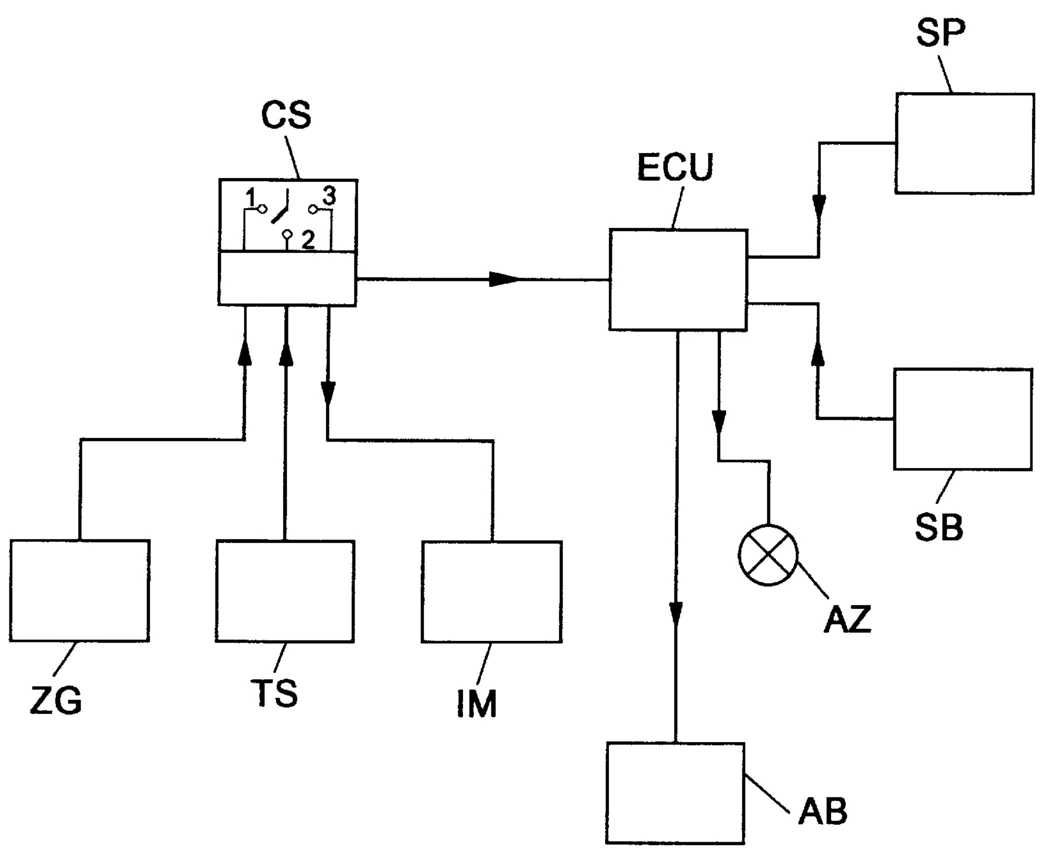
SP
CS
ECU
1
3
2
SB
AZ
ZG
TS
IM
AB

DEVICE FOR DETECTING THE TYPE OF OCCUPANCY OF THE PASSENGER'S SEAT OF A MOTOR VEHICLE

FIELD OF THE INVENTION

The present invention relates to a device for detecting at least one type of occupancy of the passenger's seat of a motor vehicle for which the passenger-side air bag absolutely must not be activated.

BACKGROUND INFORMATION

Research by the NHTSA (National Highway Traffic Safety Administration) in the United States has revealed that children in a rear-facing child seat on the front passenger's side of a vehicle have suffered fatal injuries due to air bag deployment. The same thing has occurred with children sitting in the passenger seat too close to the air bag deployment unit. These fatalities could have been prevented by deactivation of the passenger-side air bag. There are also situations in which activation of the passenger-side air bag would be superfluous, e.g., when the passenger's seat is occupied by an object instead of a person.

To be able to identify different types of occupancy of the passenger's seat when the passenger-side air bag must not be activated, various systems are available for sensing seat occupancy. One very expensive option would be an image processing system that could detect whether the passenger's seat was occupied by a child's child seat, a person or an object and could also sense the distance between the person and the air bag, so the air bag could be deactivated in critical types of occupancy. One such method of identifying seat occupancy based on the image processing principle is known from German Patent No. DE 44 00 664 C2, for example.

Another principle for identification of seat occupancy is described in the Proceedings of the Third International Symposium on Sophisticated Car Occupant Safety Systems, Air Bag 2000, Nov. 26/27, 1996, Karlsruhe (Germany), pages 18-1 through 18-13. The seat occupancy sensor presented in this document is a mat integrated into the passenger's seat so that its electric resistance changes as a function of a force or pressure acting on it. The mat thus has the function of a weight sensor to ascertain whether an adult or child is occupying the seat. However, such a weight determination can be performed only with a rather large error margin, and the results also depend greatly on temperature, so it is often impossible to differentiate clearly between an adult and a child. Since occupancy of the passenger's seat by a rear-facing child seat is especially critical, as mentioned above, the same document describes a sensor which detects unambiguously the presence of a rear-facing child seat on the passenger's seat. This sensor is based on an electromagnetic transponder principle, with transmitters and receivers provided in both the child seat and the passenger's seat. This sensor principle would require that every child seat available on the market be equipped with two resonator coils. Hence, this is a relatively expensive sensor principle.

An object of the present invention is to create a device of the type mentioned above which can be implemented with the lowest possible expense and which will identify with great reliability at least one type of occupancy of the passenger's seat for which the passenger-side air bag definitely must not be activated.

SUMMARY OF THE INVENTION

This object is achieved due to the fact that a manually operated switch is provided, this switch having at least one switch position assigned to one type of occupancy for which the passenger-side air bag must not be deployed; a control unit is provided to deactivate the passenger-side air bag when the switch is in this switch position; and means are provided to prevent the vehicle from moving after the engine has been started unless the switch has first been activated. The manually operated switch is technically a very simple means of indicating that the passenger's seat is occupied in a way such that the passenger-side air bag must not be deployed. To rule out the possibility of forgetting to operate the switch, measures are taken to ensure that the vehicle cannot be driven until the switch has been operated.

Another safety measure is provided to prevent forgetting to operate the switch, namely at least the passenger-side door has a door-operated switch, and the vehicle is prevented from driving away unless the switch has been operated after the door-operated switch detects that the door has been opened.

The manually operated switch has at least one switch position assigned to occupancy of the seat by a rear-facing child seat.

In addition to the manually operated switch, there may also be a seat occupancy sensor to detect whether the vehicle seat is occupied by an animate object, and a seat position sensor to detect whether the passenger's seat is in a position near the air bag or remote from the air bag. In an exemplary embodiment of the present invention, a control unit will not deactivate the passenger-side air bag only under the following conditions: either when the manually operated switch is not in the switch position for a rear-facing child seat and the seat position sensor indicates that the seat is in a position remote from the air bag and the seat occupancy sensor does not detect an animate object or when the manually operated switch is not in the switch position for a rear-facing child seat and the seat position sensor indicates a position remote from the air bag and the seat occupancy sensor detects an animate object. In all other states of the sensors and the manually operated switch, the passenger-side air bag is deactivated.

BRIEF DESCRIPTION OF THE DRAWING

The FIGURE shows a block diagram of a device with which it is possible to detect a type of occupancy of the passenger's seat of a motor vehicle for which the passenger-side air bag must absolutely not be activated.

DETAILED DESCRIPTION

As shown in the FIGURE, the device contains a manually operated switch CS, which has three switch positions 1, 2 and 3 here, for example. At least one of these three switch positions is assigned to one type of occupancy of the passenger's seat of a motor vehicle for which the passenger-side air bag must not be activated. Such a type of occupancy would be, for example, a rear-facing child seat. The air bag should also not be activated if the passenger's seat is not occupied by a person or is not occupied at all or is occupied by a rigid object. With switch CS shown in this embodiment, switch position 1 is assigned to occupancy of the passenger's seat with a rear-facing child seat, and switch position 2 is for occupancy with a forward-facing child seat. The third switch position 3 is a neutral switch position which is automatically assumed by switch CS after the vehicle's ignition is turned off. Switch CS receives from the engine ignition system, represented by contact element ZG, information regarding whether the ignition is on or off.

In a variation of the embodiment, manually operated switch CS may also be provided with more than two switch positions representing types of occupancy in which the passenger-side air bag must not be activated. On the other hand, there may also be just one single switch position which stands in general for all types of occupancy where the passenger-side air bag must not be activated.

Manually operated switch CS sends its information regarding its instantaneous switch position to a control unit ECU which controls the deployment of passenger-side air bag AB.

Measures must be taken to rule out the possibility of forgetting to operate switch CS and set it in proper switch position 1 when the passenger's seat is occupied by a rear-facing child seat. To prevent such forgetfulness, the device is designed so that switch CS is operated again before each time the ignition is turned on. The information about the fact that the ignition has been turned on is obtained by switch CS from contact element ZG. If switch CS has not yet been operated before the ignition is turned on, a contact element IM receives the respective information from switch CS, and then contact element IM will prevent the vehicle from being driven away. Contact element IM either engages a drive block or locks the transmission. Other measures in vehicular areas that would prevent the vehicle from being driven away are naturally also feasible.

Manually operated switch CS also receives from contact element TS information regarding whether the passenger-side door or any other door of the vehicle has been opened. The respective vehicle door therefore has a door opening switch. For example, if the passenger-side door has been opened, this may be an indication that the occupancy of the passenger's seat has changed. Therefore, after switch CS has received a door opening signal from contact element TS, it must be operated manually. If this does not happen, the vehicle is prevented from driving away, as described above. The use of the door opening signal from contact element TS provides further security against forgetting to set switch CS in its proper switch position. Finally, a child seat might also be installed on the passenger's seat while the engine is running, without having operated the ignition. To do so, however, at least the passenger-side door would have to be opened. Using the door opening signal provides even greater security against forgetting to operate the switch when the passenger's seat has been occupied by a rear-facing child seat.

In addition to receiving the switch signal indicating switch position 1, 2 or 3 of switch CS, control unit ECU for the passenger-side air bag may also receive output signals from other sensors which can distinguish whether the instantaneous seat occupancy requires deactivation of the passenger-side air bag. Such sensors may be, for example, a seat position sensor SP, which identifies whether the passenger's seat is in a position close to or remote from the air bag, and a seat occupancy sensor SB which identifies whether the vehicle seat is occupied by an animate or inanimate object. Seat position sensor SP comprises, for example, a mechanical switch which is set in a first position (logic 1) when the passenger's seat is pushed forward on its track into the area close to the air bag and is set in a second switch position (logic 0) when the passenger's seat is pushed back on its track into an area remote from the air bag. Seat occupancy sensor SB delivers a logic 0 at its output when the vehicle seat is not occupied by an animate object, and it delivers a logic 1 when it senses an animate object.

As indicated in German Patent No. DE 196 30 260 A1, a seat occupancy sensor may comprise, for example, a piezoelectric cable encapsulated in a mat. Thus, a person's pulse or respiratory movements could be detected to permit differentiation between animate and inanimate objects.

In cases where control unit ECU decides to deactivate passenger-side air bag AB, it will activate a display device AZ in the dashboard.

As shown by the following table, control unit ECU combines the output signals of switch CS and the two sensors SP and SB. Control unit ECU delivers a logic 1 as its output signal, which causes passenger-side air bag AB to remain activated, for only two signal combinations. This is the case either when the manually operated switch CS is not in switch position 1 for a rear-facing child seat but instead is in switch position 2 for a forward-facing child seat and seat position sensor SP indicates that the seat is remote from the air bag, and seat occupancy sensor SB does not detect an animate object, or when manually operated switch CS is not in the switch position for a rear-facing child seat or for a forward-facing child seat and seat position sensor SP indicates a position remote from the air bag and seat occupancy sensor SB detects an animate object. In the first case, a forward-facing child seat is on the passenger's seat, which has been pushed back into a position remote from the air bag. In the second case, the passenger's seat is occupied by an adult person, and the passenger's seat is in a position remote from the air bag. In all other cases, the output signal of control unit ECU is a logic 0 which leads to deactivation of passenger-side air bag AB. States indicated with an X in the truth table cannot occur.

| | | CS | | | |
|---|---|---|---|---|---|
| SP | SB | 1 | 2 | Output | Type of occupancy seat |
| 0 | 0 | 0 | 0 | 0 | Inanimate object |
| 0 | 0 | 0 | 1 | 2 | Forward-facing child seat, passenger's seat remote from air bag |
| 0 | 0 | 1 | 0 | 0 | Rear-facing child seat |
| 0 | 0 | 1 | 1 | X | |
| 0 | 1 | 0 | 0 | 1 | Adult passenger's seat remote from air bag |
| 0 | 1 | 0 | 1 | 0 | Forward-facing child seat, animate object |
| 0 | 1 | 1 | 0 | 0 | Rear-facing child seat, animate object |
| 0 | 1 | 1 | 1 | X | passenger's seat near the air bag |
| 1 | 0 | 0 | 0 | 0 | |
| 1 | 0 | 0 | 1 | 0 | |
| 1 | 0 | 1 | 0 | 0 | |
| 1 | 0 | 1 | 1 | X | |
| 1 | 1 | 0 | 0 | 0 | |
| 1 | 1 | 0 | 1 | 0 | |
| 1 | 1 | 1 | 0 | 0 | |
| 1 | 1 | 1 | 1 | X | |

In cases where the users of a vehicle never carry children, switch CS may be permanently deactivated at the factory. If the vehicle is sold to a third party, switch CS can be reactivated on request.

What is claimed is:

1. A device for detecting at least one type of occupancy of a passenger seat of a motor vehicle for which a passenger-side air bag should not be activated, comprising:

- a manually operated switch having at least one switch position assigned to the at least one type of occupancy;
- a control unit for deactivating the air bag when the switch is in the at least one switch position; and
- means for preventing the vehicle from being driven away after starting an engine of the vehicle if the switch has not first been operated, wherein the means for preventing the vehicle from being driven away prevents the vehicle from being driven away if the manually operated switch has not been operated after a door-operated switch of a passenger-side door of the vehicle detects that the door has been opened.

2. The device according to claim 1, wherein the at least one type of occupancy includes a rear-facing child seat in the passenger seat.

3. The device according to claim 1, further comprising a seat occupancy sensor for identifying whether the passenger seat is occupied by an animate object.

4. The device according to claim 1, further comprising a seat position sensor for identifying whether the passenger seat is proximate to the air bag.

5. The device according to claim 1, wherein the control unit does not deactivate the air bag only when either of the following two sets of conditions are satisfied:

(a) the switch is not in a first position for a rear-facing child seat, (b) a seat position sensor indicates that the passenger seat is remote from the air bag, and (c) a seat occupancy sensor does not detect an animate object; or (d) the switch is not in the first position for the rear-facing child seat, (e) the seat position sensor indicates that the passenger seat is remote from the air bag, and (f) the seat occupancy sensor detects an animate object.

6. The device according to claim 5, wherein:

in condition (a), the switch is in a second position for a forward-facing child seat, and in condition (d), the switch is also not in the second position for the forward-facing child seat.

7. The device according to claim 1, wherein the switch provides switch position information to the control unit for deactivating the air bag.

8. The device according to claim 1, wherein the switch obtains ignition information from an ignition contact element.

9. The device according to claim 1, wherein the means for preventing includes a switch operation information contact element that receives switch operation information and prevents the vehicle from being driven away if the switch has not been operated before an ignition of the vehicle is turned on.

10. The device according to claim 9, wherein the contact element engages a drive block of the vehicle.

11. The device according to claim 9, wherein the contact element locks a transmission of the vehicle.

* * * * *